United States Patent
Pathi et al.

(10) Patent No.: US 7,408,930 B2
(45) Date of Patent: Aug. 5, 2008

(54) ADDRESS LEARNING TO ENABLE HIGH SPEED ROUTING TABLE LOOKUPS

(75) Inventors: Sridhar Pathi, San Jose, CA (US); Takeshi Shimizu, Sunnyvale, CA (US)

(73) Assignee: Fujitsu Limited, Kawasaki (JP)

( * ) Notice: Subject to any disclaimer, the term of this patent is extended or adjusted under 35 U.S.C. 154(b) by 1023 days.

(21) Appl. No.: 10/360,004

(22) Filed: Feb. 7, 2003

(65) Prior Publication Data

US 2004/0156362 A1    Aug. 12, 2004

(51) Int. Cl.
*H04L 12/56* (2006.01)
(52) U.S. Cl. .................. 370/389; 370/392; 370/395.32
(58) Field of Classification Search .................. 370/401, 370/389, 428, 392, 395.32; 365/202
See application file for complete search history.

(56) References Cited

U.S. PATENT DOCUMENTS

| | | | | | |
|---|---|---|---|---|---|
| 5,852,607 | A | * | 12/1998 | Chin | 370/401 |
| 5,949,786 | A | * | 9/1999 | Bellenger | 370/401 |
| 6,034,958 | A | * | 3/2000 | Wicklund | 370/395.32 |
| 6,798,777 | B1 | * | 9/2004 | Ferguson et al. | 370/392 |
| 2002/0051450 | A1 | * | 5/2002 | Ganesh et al. | 370/389 |
| 2004/0047209 | A1 | * | 3/2004 | Lien et al. | 365/202 |
| 2005/0147113 | A1 | * | 7/2005 | Brown | 370/428 |

* cited by examiner

*Primary Examiner*—Chi Pham
*Assistant Examiner*—Albert T. Chou
(74) *Attorney, Agent, or Firm*—Baker Botts L.L.P.

(57) ABSTRACT

A switch includes multiple ports, a switching fabric, and a routing table module. The routing table module includes a multi-bank memory structure for maintaining routing information. The routing information enables the switching fabric to route packets between the ports based upon addresses within the packets.

23 Claims, 3 Drawing Sheets

ADDRESS LEARNING TO ENABLE HIGH SPEED ROUTING TABLE LOOKUPS

TECHNICAL FIELD OF THE INVENTION

This invention relates generally to communication systems and, more particularly, to address learning to enable high speed routing table lookups.

BACKGROUND OF THE INVENTION

Technology advances inexorably drive demand for increased speed of data communications. To meet this demand, network components must increasingly be designed to perform high speed operations. For example, to account for ever increasing speeds on transmission lines, switches must be capable of making high speed routing decisions in order to operate at these wire speeds.

SUMMARY OF THE INVENTION

In accordance with the present invention, techniques for address learning to enable high speed routing table lookups are provided. According to particular embodiments, a switch includes a routing table module formed by multiple memory banks, with the routing table module capable of performing high speed routing table lookups.

According to one embodiment, a switch includes multiple ports for communicating packets, a switch fabric for transporting the packets between the ports, and multiple memory banks logically divided into a plurality of rows, wherein each of the rows includes a storage location from each of the memory banks, and each of the storage locations is capable of maintaining a routing entry. The switch also includes an arbitration module that can receive lookup requests and learn requests from the ports and schedule memory access operations based upon the lookup requests and the learn requests. The memory access operations typically include at least one address. The switch further includes a memory access module that can receive the memory access operations, determine a hash key from the address, wherein the hash key indicates a particular one of the rows, and access the indicated row to perform at least one of the memory access operations.

Embodiments of the invention provide various technical advantages. By implementing a routing table module using multiple memory banks, a switch can provide a relatively small and inexpensive yet extremely fast routing table module. This routing table module may, at times, sacrifice completeness of routing information, but these sacrifices can result in a faster, less expensive implementation. For example, particular embodiments provide limited space for maintaining port to address mapping information. This limited space may not support storage of all potential port to address mappings. In these circumstances, a switch may resort to packet flooding instead of "intelligent" routing. However, particular embodiments attempt to limit these occurrences. Moreover, these embodiments may still be designed to comply with standards, such as the ANSI/IEEE 802 standards.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, references now made to the following description, taken in conjunction with the accompanying drawings, in which.

DETAILED DESCRIPTION OF THE INVENTION

Figure 1:
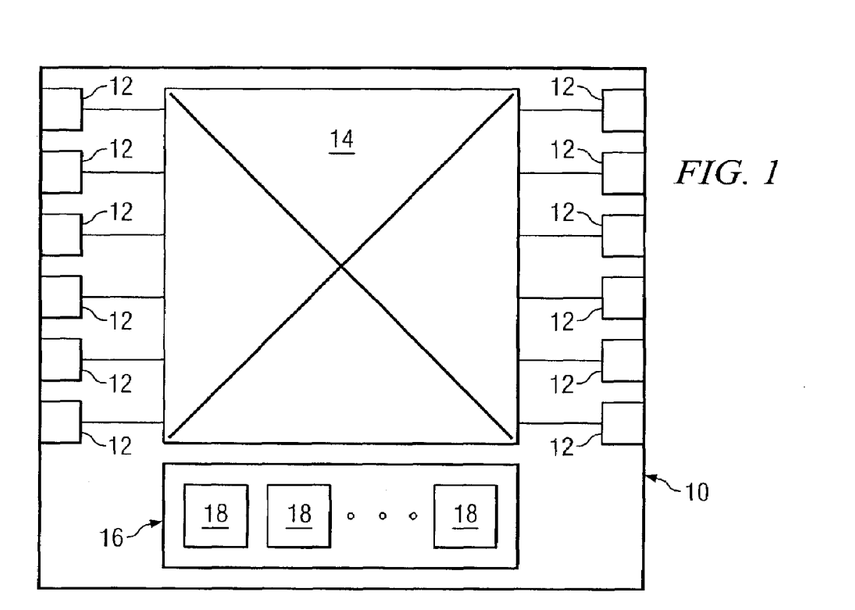
FIG. 1 illustrates a multi-port switch having a routing table module according to particular embodiments of the present invention.

FIG. 1 illustrates a switch 10 that includes multiple ports 12 interconnected by a switching fabric 14. Switch 10 also includes a routing table module 16 that includes multiple memory banks 18 for storing routing information. In general, routing table module 16 maintains routing information to control the switching of packets between ports 12. Specifically, routing table module 16 provides a multi-bank memory structure to provide high speed routing table operations.

Each port 12 represents hardware, including any appropriate controlling logic, for transmitting and receiving packets. For example, each port 12 may include an input module and an output module for receiving and transmitting packets. The term packet, as used within this description, refers to any segmentation of information that includes addressing information. For example, packets may encompass Ethernet frames, internet protocol (IP) packets, asynchronous transmission mode (ATM) cells, and/or any other suitable information segment. Within switch 10, switching fabric 14 provides for the transmission of packets from any one port 12 to any or all ports 12 within switch 10. While illustrated as a single block within switch 10, it is contemplated that switching fabric 14 may contain any suitable combination and arrangement of elements configured and designed to provide packet switching at a rate sufficient to support communications of ports 12.

Within switch 10, routing table module 16 maintains routing information to control the switching of packets between ports 12. To control switching fabric 14, the routing information includes any number of entries mapping addresses to ports. Switch 10 directs packets between ports 12 based on this routing information. For example, an entry in the routing information may map address XYZ to port A. When another port 12 receives a packet destined to address XYZ, switching fabric 14 can direct that packet to port A. Thus given appropriate routing information within routing module 16, switching fabric 14 can "intelligently" switch packets between ports 12. Moreover, while this example illustrates a single port mapped to an address, switch 10 contemplates entries mapping addresses to any number of ports 12.

In certain circumstances, routing table module 16 may not map addresses for all received packets. For example, one of ports 12 may receive a packet with a destination address that does not match an entry within routing table module 16. According to particular embodiments, if routing table module 16 does not provide a mapping, then switch 10 "floods" the packet to all other ports 12. That is, switch 10 may transmit the packet from all ports 12 other than the receiving port 12.

As an example of the routing table operation, consider a port 12 receiving a packet that includes a destination address. If routing table module 16 provides a port mapping for that destination address, then switching fabric 14 provides that packet to all ports 12 indicated within the routing information. If, however, routing table module 16 provides no mapping for the indicated destination address, then switching fabric 14 floods the packet to all other ports 12 of switch 10. Packet flooding may result in increased network traffic, but guarantees that the packet will be communicated from the correct port 12.

Within routing table module 16, the routing information may contain static and dynamic entries. Static routing entries include entries set by firmware, configured by system administrators and/or otherwise statically established within routing table module 16. For example, a system administrator may configure static routing entries based upon a known network topology. Other examples of static entries include routing information for special network addresses, such as broadcast, multicast, or other specialized addresses.

Dynamic routing entries are created, maintained, and deleted automatically during the operation of switch 10. According to particular embodiments, switch 10 uses a learning scheme to populate routing table module 16 with dynamic routing entries. According to this scheme, switch 10 uses the source addresses in received packets to populate entries within routing table module 16. For example, consider switch 10 receiving a packet at port A, with the packet having a source address of XYZ. If routing table module 16 does not currently reflect this mapping, routing table module 16 can add a routing entry that maps address XYZ to port A. When subsequent packets are received with a destination address of XYZ, switch 10 can communicate these packets from port A based on the mapping within routing table module 16.

Routing table module 16 may also provide for removal of routing entries from the routing information. For example, routing table module 16 may periodically delete outdated entries. Routing table module 16 may perform this "aging" of outdated entries using time stamps and/or other appropriate mechanisms maintained within the routing information.

According to particular embodiments, each entry within routing table module 16 includes an address, routing information, and management information. The address maintains information, such as a media access control (MAC) address, to match against addresses in received packets. The routing information indicates the port or ports that should receive a packet with a destination address matching the address within the entry. According to particular embodiments, the routing information may be implemented as a bit vector, with each bit indicating whether or not a corresponding port maps to the particular address. For example, given a twelve port configuration, a twelve bit vector could indicate which ports 12 map to the indicated address.

The management information includes any appropriate data for maintaining an entry. According to particular embodiments, the management information includes a time stamp, a static indicator, a valid indicator, and a check code. The time stamp reflects the age of the entry and may be used by switch 10 to perform aging operations. The static indicator indicates whether or not the entry is static. According to particular embodiments, if the static indicator is set, switch 10 will not dynamically delete the entry. The valid indicator specifies whether or not the mapping indicated in the entry is correct. Thus, for example, to "delete" an entry, routing table module 16 may simply set the valid indicator to invalid. A check code field may be included within the management information to provide reliability.

During operation, routing table module 16 may provide three basic operations: learn, delete, and lookup. As discussed, switch 10 handles both dynamic and static learning. Dynamic learning adds entries to routing table module 16 based upon source addresses in received packets. Static learning encompasses specific configurations of routing information during manufacturing, set up, or at other appropriate times. For a learning operation, routing table module 16 first determines whether it has an appropriate mapping for the address to be learned and then, if no such mapping exists, creates the entry within the routing information. Thus, a learning operation may require two cycles, one to read and one to write.

Similar to the learn operation, the delete operation handles both dynamic and static removal of entries. Dynamic deletions may occur based upon aging or other appropriate circumstances. Static deletions occur based upon configurations or other suitable indications to change the static entries within routing table module 16. Similar to a learning operation, a delete operation may require both a read and a write step. For example, first routing table module 16 can determine whether an entry is sufficiently aged, and then, if so, routing table module 16 may delete the entry. Thus, a delete operation may take two cycles to complete.

Lookup operations, as previously discussed, attempt to discover mappings for destination addresses of received packets. According to particular embodiments, switch 10 handles lookups of both multicast and unicast addresses. For multicast addresses, routing table module 16 is typically configured with static routing entries. This enables intelligent routing of multicast packets. For unicast packets, routing table module 16 typically handles routing decisions based upon dynamic learning. Thus, switch 10 will typically flood unicast packets until appropriate address mappings are learned. According to particular embodiments, switch 10 can differentiate between multicast and unicast address based upon information in the addresses. For example, according to the 802.1 standard, multicast addresses are differentiated from unicast addresses based upon the value of a specific bit. Routing table module 16 can perform a lookup operation using a single read operation. Thus, a lookup operation may take only a single cycle to complete.

Figure 2:
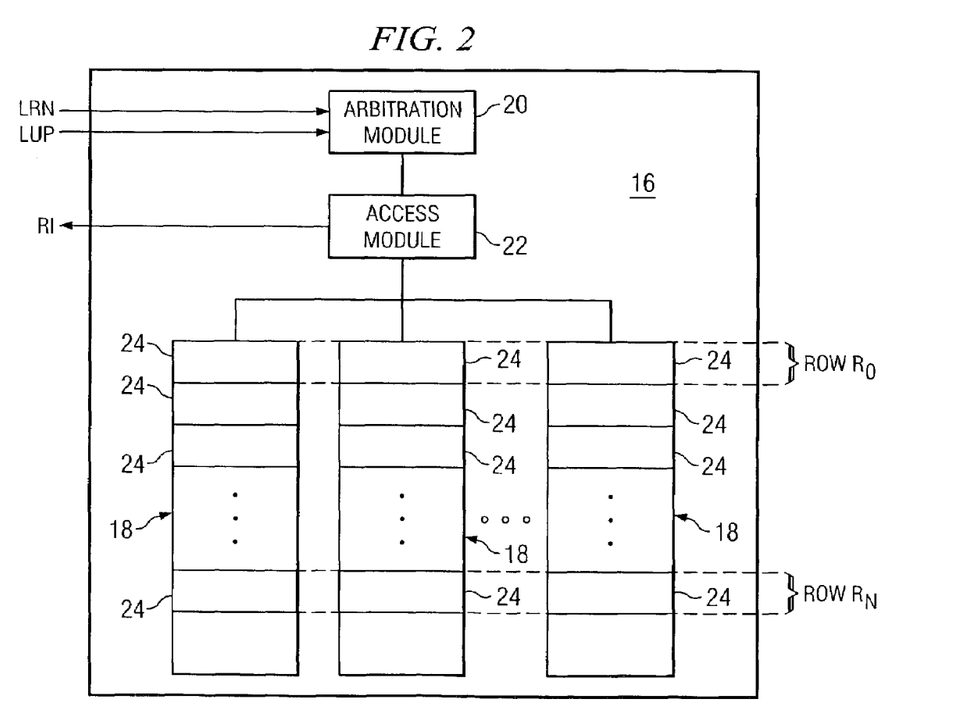
FIG. 2 is a block diagram illustrating components of an exemplary routing table module from this switch.

FIG. 2 is a block diagram illustrating exemplary functional components for routing table module 16 that include multiple memory banks 18, an arbitration module 20, and an access module 22. In the embodiment illustrated, arbitration module 20 couples to each port 12 within switch 10 to receive learned (LRN) and lookup (LUP) requests. Similarly, access module 22 couples to each port 12 within switch 10 to provide routing information (RI) in response to lookup requests. During operation, memory banks 18 maintain routing information for switch 10. In general, the multiple memory bank configuration and the associated access scheme enable routing table module 16 to provide high speed routing table operations.

Memory banks 18 each represent any suitable hardware, including appropriate controlling logic, for storing routing entries. Each memory bank 18 may be separately accessed to perform a read or write operation. Thus, for example, during a particular cycle, access module 22 may perform a read operation from some or all memory banks 18. Similarly, during a cycle, access module 22 may perform a write operation on some or all memory banks 18. Access module 22 may further mix these operations such that, for example, access module 22 writes to one memory bank 18 and reads from all other memory banks 18.

In the embodiment illustrated, each memory bank 18 is logically divided into multiple locations 24. For example, each memory bank 18 may be divided into 1024 locations, with each location capable of maintaining a routing entry. In addition, routing table module 16 may further logically divide the group of memory banks 18 into rows, with each row encompassing corresponding locations 24 across multiple memory banks 18. For example, a first row (shown as $R_0$) may include the first location 24 from each memory bank 18. Similarly, an $n^{th}$ row (shown as $R_n$) may include the $n^{th}$ location 24 from each memory bank 18. Thus, for example, if each memory bank 18 is logically divided into 1k locations 24, then the group of memory banks 18 may be logically divided into 1k rows.

Access module 22 accesses memory banks 18 using read and/or write operations. According to particular embodiments, access module 22 may perform read operations across an entire row. Thus, for example, access module 22 may simultaneously read the contents of each location 24 within a particular row. For write operations, access module 22 may target a particular memory bank 18. For example, access module 22 may write to a particular location 24 within a selected memory bank 18.

According to particular embodiments, an individual memory bank 18 may not support simultaneous read and write operations. Thus, if access module 22 chooses to write to a particular memory bank 18, access module 22 may not be permitted to simultaneously read from that particular memory bank 18. However, this does not affect the ability of access module 22 to read from the other memory banks 18. Therefore, during a single cycle, access module 22 may write to one memory bank 18 while reading from all other memory banks 18. In this example, if access module 22 is attempting to read the contents of an entire row, access module 22 will only access locations 24 in memory banks 18 not performing the write operation. Thus, a write operation in one or more banks 18 may affect the ability of access module 22 to simultaneously read from all locations 24 across a row.

For example, consider routing table module 16 having four memory banks 18. During a cycle, access module 22 schedules a write operation for the first memory bank 18 and a read operation for a particular row. During the cycle, access module 22 will only receive information from locations 24 within the second, third, and fourth memory banks 18. Thus, given this circumstance, access module 22 may not have access to the information within one of locations 24 within the particular row. This may affect the ability of routing table module 16 to detect matches in routing information, as will be discussed in greater detail below.

According to particular embodiments, access module 22 uses a hashing technique for access to memory banks 18. According to these embodiments, access module 22 can generate a hash key from a source or destination address. Access module 22 then uses this hash key to access an indicated row within memory banks 18. For example, consider memory banks 18 logically divided into 1k rows. Using ten bits of information from an address, access module 22 can generate a hash key that will uniquely identify one of the rows. Thus using the hash key, access module 22 can determine an appropriate row for looking up or learning an address.

For a lookup request, access module 22 receives a destination address, generates a hash key from this address and then reads from the row indicated by the hash key. If the destination address matches to an entry in one of locations 24 in the row, access module 22 can return the routing information from the matching entry. If the destination address fails to match any entries within locations 24 of the indicated row, access module 22 can indicate a "miss," which may result in flooding of the packet.

For learning operations, access module 22 performs both read and write operations. Using the source address provided in the learn operation, access module 22 generates a hash key and reads from the row indicated by the hash key. If the row does not contain a match to the source address, routing table module 16 may attempt to learn the routing information. Thus, in the next or some subsequent cycle, access module 22 may perform a write operation to insert the entry into any location 24 within the row identified by the hash key. According to particular embodiments, routing table module 16 attempts to select an empty location 24 within the indicated row. For example, routing table module may select the first memory bank 18 having an empty location 24 in the indicated row or may use random or pseudo random algorithm to select an empty location 24 within the indicated row. If there are no empty locations 24 within the indicated row, routing table module 16 may choose to disregard the learning request or to queue the request until an empty location 24 is available.

Because learning may depend upon the availability of empty locations 24 within the row indicated by the hash key, routing table module 16 may occasionally be unable to learn some address mapping information. For example, consider routing table module 16 having eight memory banks 18, with all eight memory locations 24 in a particular row currently valid. Routing table module 16 may, as previously discussed, simply disregard any learning requests received that result in hash keys to the particular row. This can result in increased flooding of subsequent traffic, but permits routing table module 16 to use a relatively small, high speed memory structure.

As previously discussed, access module 22 may schedule read and write operations for different memory banks 18 within the same cycle. Thus, for example, access module 22 may schedule a write to one of memory banks 18 during the same cycle that access module 22 attempts to read from a row. As previously discussed, this can result in access module 22 reading only entries from those memory banks 18 not scheduled for a write operation. When performing a lookup for a destination address, this situation can result in a "false" miss. A false miss occurs when memory banks 18 include a match for a destination address, but the memory bank 18 maintaining that matching entry performs a write operation while the remaining memory banks 18 perform a read operation. In the case of a false miss, access module 22 will indicate a miss, even though the row actually included a match. The chances of a false miss are limited by the number of memory banks 18 within routing table module 16. For example, if write operations are limited to a single memory bank 18 and routing table module 16 includes four memory banks 18, then the chances of a false miss during a read/write cycle are 25%. Yet when it is considered that write operations typically occur at most only every other cycle (since the learning and delete operations take two cycles), the chances of a false miss are cut in half.

According to particular embodiments, routing table module 16 prevents false misses from occurring during lookup operations for multicast addresses or for read operations for learning. For example, because of strict standards that may apply to multicast addresses, routing table module 16 may prevent any write operations during a multicast lookup operation. Similarly, for learn operations, routing table module 16 may prevent simultaneous write operations during the read portion of the learn operation. This prevents routing table module 16 from improperly detecting a need to learn a new entry based on a false miss.

To handle scheduling of read and write operations for access module 22, routing table module 16 includes arbitration module 20. During operation, arbitration module 20 receives lookup and learn operations from ports 12 and determines appropriate read and write operations for access module 22. Arbitration module 20 prioritizes these lookup and learn operations along with any other appropriate operations, such as aging of entries in memory banks 18. According to particular embodiments, arbitration module 20 places highest priority on any outstanding lookup requests. Given highest priority to lookup requests, arbitration module 20 will provide timely servicing of these requests even given worst case traffic.

For example, consider switch 10 with twelve ports 12, and each port 12 simultaneously receiving a minimum size Ethernet frame. According to Ethernet standards, a minimum size Ethernet frame is approximately 64 bytes. In certain embodiments, switch 10 can receive a minimum size Ethernet frame in approximately twenty cycles. Therefore, if each port 12 simultaneously receives a minimum size Ethernet frame, then no port 12 will begin receiving another frame until twenty cycles later (since each port 12 will take at least twenty cycles to receive the current frame). Even given this worst case scenario, the lookup requests from every port 12 may be serviced by arbitration module 20 within twelve cycles. This leave approximately eight spare cycles before any new lookup requests will arrive.

In this example, each port 12 may also generate a learn request when a packet is received. Thus, in the worst case example, arbitration module 20 may also receive twelve learn requests along with the twelve lookup requests. Given only eight spare cycles, arbitration module 20 may choose to service only selected ones of these learn requests. Thus giving priority to lookup requests relegate learn request to spare cycles. As additional learn requests arrive, arbitration module 20 may choose to queue learn requests or to simply discard unserviced learn requests. For example, arbitration module 20 may simply maintain the most recently received learn request for each port 12. This ensures that learn requests reflect the most recently received port mappings.

While the embodiment illustrated and the preceding description focus on a particular embodiment of routing table module 16, switch 10 contemplates routing table module 16 having any suitable combination and arrangement of elements for supporting a mixed, simultaneous access memory structure. Thus, the functionalities performed by the particular elements illustrated may be separated or combined as appropriate, and some or all of these elements may be implemented by logic encoded in media. For example, the functions of arbitration module 20 and access module 22 may be separated and/or combined as appropriate and any of their operations may be implemented by suitable logic. Moreover, while memory banks 18 are illustrated as separate components, routing table module may use any appropriate memory structure that provides similar functionality. Also, while shown as a single module, the functionalities of some or all of the illustrated components of routing table module 16 may be distributed among other elements of switch 10.

Figure 3:
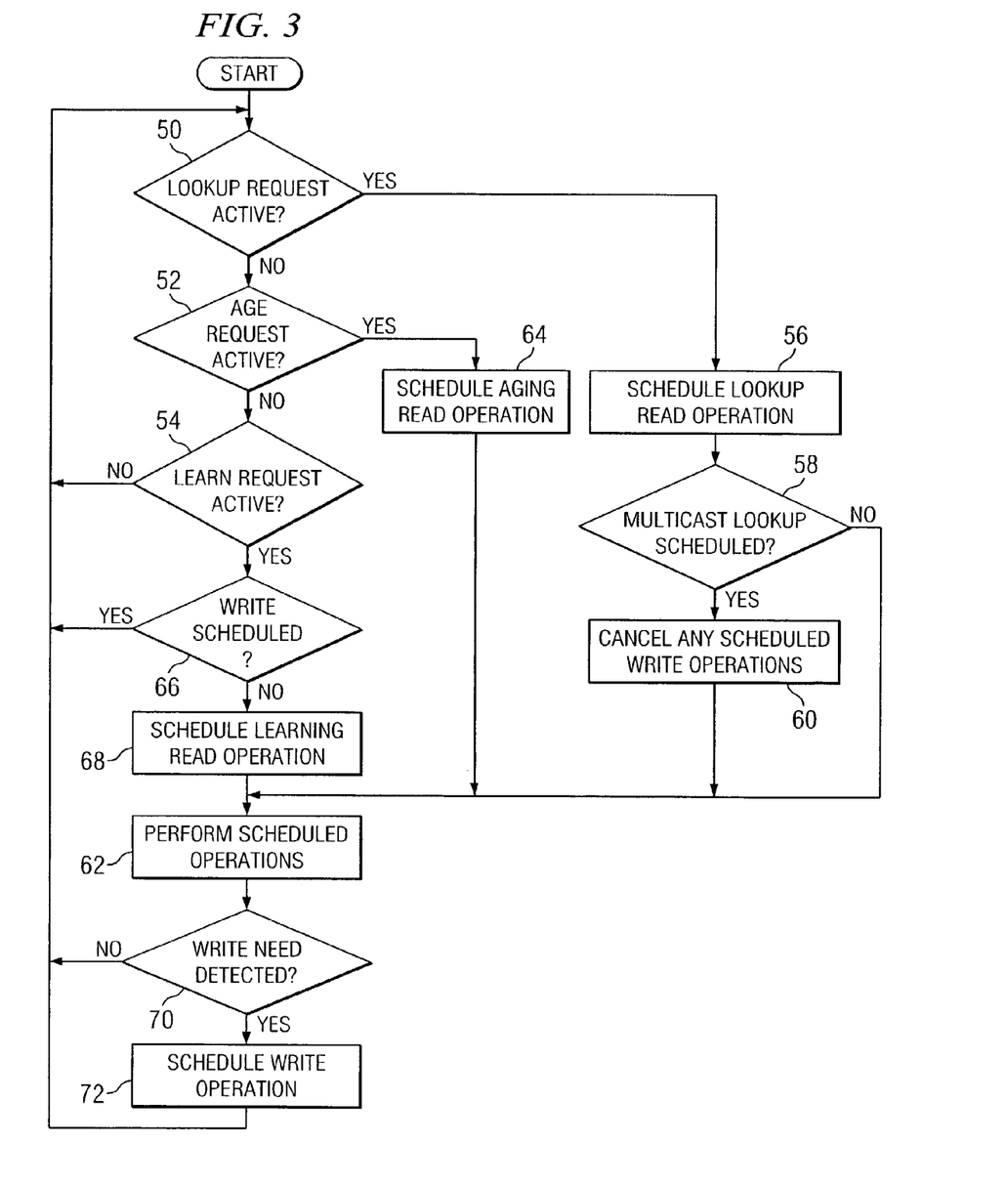
FIG. 3 is a flowchart illustrating a method for handling routing table operations using a multi-bank routing table module.

FIG. 3 is a flowchart illustrating a method for routing table module 16 to respond to lookup and learn requests and perform periodic maintenance of routing information maintained within memory banks 18. The following description of the flowchart is provided with reference to the elements of routing table module 16 described above. However, as previously noted, routing table module 16 may include any appropriate combination and arrangement of elements.

Arbitration module 20 determines whether any lookup requests are currently active at step 50. For example, arbitration module 20 may determine whether any one of ports 12 is currently requesting a lookup operation. If not, arbitration module 20 determines whether any aging requests are active at step 52. For example, arbitration module 20 may periodically, sporadically, or at any other appropriate time generate aging requests to provide for the occasional removal of outdated entries from memory banks 18. If no aging requests are active, arbitration module 20 determines whether any learn requests are active at step 54. For example, arbitration module 20 can determine whether any of ports 12 have requested a learning operation. If not, flow returns to step 50. Thus, in steps 50, 52, and 54 arbitration module 20 provides for servicing of lookup, aging, and learning requests while giving highest priority to lookup requests.

If arbitration module 20 detects a lookup request at step 50, arbitration module 20 schedules a lookup read operation at step 56. Arbitration module 20 determines whether the scheduled lookup is for a multicast address at step 58. For example, by examining a particular bit within the destination address, arbitration module 20 may determine whether or not the address indicates a multicast operation. If so, arbitration module 20 cancels any scheduled write operations at step 60. For example, in a previous cycle, arbitration module 20 may have scheduled a write operation for a learning or delete command. If so, arbitration module 20 may cancel this write operation to prevent a false miss during the read operation. At step 62, access module 22 performs the scheduled operations. In this case, access module 22 performs the scheduled lookup read operation and, if any write operations remain scheduled, performs the scheduled write operation.

If no lookup operation is detected, arbitration module 20 checks for aging requests at step 52. Upon detecting an aging request, arbitration module 20 schedules an aging read operation at step 64. In this case, access module 22 performs the scheduled operations at 62, which includes performing the scheduled aging read operation.

Given no active lookup or aging requests, arbitration module 20 may detect an active learn request at step 54. Upon detecting an active learn request, arbitration module 20 determines whether or not a write operation is currently scheduled at step 66. For example, in a previous cycle, arbitration module 20 may have scheduled a write operation. Because routing table module 16 attempts to prevent simultaneous write and learning read operations, arbitration module 20 checks for the write operation at step 66. If a write operation is scheduled, arbitration module 20 returns to step 50. However, if no write is scheduled, arbitration module 20 schedules a learning read operation at step 68. Access module 22 then performs the scheduled operations at 62, which includes performing the scheduled learning read operation with no simultaneous write operation.

After performing the scheduled operations at step 62, arbitration module 20 determines whether a writing need has been detected at step 70. For example, after performing a learning read operation, arbitration module 20 may determine that a learning write operation is needed. If so, arbitration module 20 schedules the write operation at step 72. Similarly, arbitration module 20 may detect a deletion need at step 70 and schedule a write operation to perform the deletion at step 72.

The preceding flowchart illustrates exemplary operation for routing table module 16 to provide routing table operations based upon access of a multi-bank memory configuration. However, the preceding flowchart and accompanying description illustrate only an exemplary method of operation, and switch 10 contemplates routing table module 16 using any suitable techniques to support the multi-bank memory scheme. Thus, many of the steps in this flowchart may take place simultaneously and/or in different orders then as shown. In addition, routing table module 16 may use methods with additional steps, fewer steps, and/or different steps, so long as the methods remain appropriate.

Figure 4:
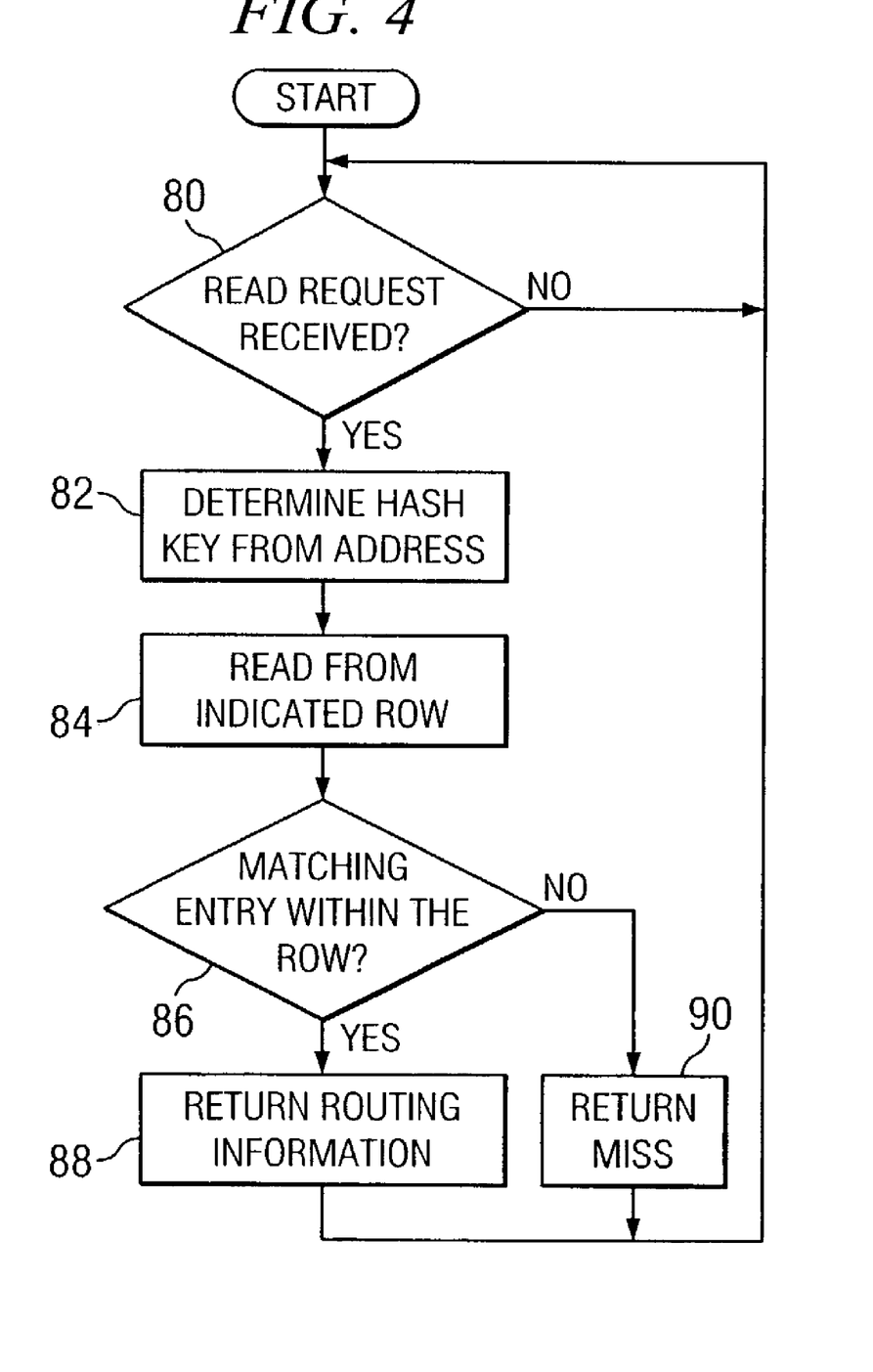
FIG. 4 is a flowchart illustrating a method accessing a multi-bank memory structure.

FIG. 4 is a flowchart illustrating the operation of access module 22 when servicing read requests. Each cycle, access module 22 determines whether a read request has been received at step 80. If not, access module 22 performs no operation with respect to read requests during the cycle. If access module 22 detects a read request at step 80, access module 22 determines a hash key from the address within the read request at step 82. For example, as previously discussed, access module 22 may determine a hash key based upon selected bits within the address.

Using the hash key, access module 22 reads from the corresponding row at step 84. As previously discussed, this read operation access all locations 24 within the corresponding row, unless a simultaneous write operation is currently scheduled. Access module 22 determines whether any entries from the row match the received address at step 86. Regardless of whether there is a concurrent write operation, access module 22 can determine whether the address results in a hit or a miss. However, given a concurrent write operation, access module 22 may, as previously discussed, detect a false miss.

Given a match, access module 22 returns the matching routing information at step 88. For example, for a lookup read operation, access module 22 may provide the routing information to the appropriate port 12. Similarly, for a learning read operation, access module 22 may inform arbitration module 20 of the hit. Given a miss, access module 22 indicates the miss at step 90. For example, for a lookup read operation, access module 22 may indicate the miss to the appropriate port 12. Similarly, for a learning read operation, access module 22 may indicate the miss to arbitration module 20.

Thus, the preceding flowchart illustrates a relatively simple technique for access module 22 to handle read requests from arbitration module 20. However, as with the earlier flowchart, this flowchart and the accompanying description illustrate only an exemplary method of operation, and switch 10 contemplates access module 22 and/or other suitable components using any suitable techniques to access routing information. Thus, many of the steps in this flowchart may take place simultaneously and/or in different orders as shown. In addition, switch 10 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A switch comprising:
a plurality of ports that communicate packets;
a switch fabric that transports received packets between the ports;
a plurality of memory banks logically divided into a plurality of rows, wherein each of the rows comprises a storage location from each of the memory banks, wherein each of the storage locations maintains a routing entry;
an arbitration module that receives lookup requests and learn requests from the ports and to schedule memory access operations based upon the lookup requests and the learn requests, wherein the memory access operations comprise at least one address; and
a memory access module that receives the memory access operations, to determine a hash key from the address, wherein the hash key indicates a particular one of the rows, and to access the indicated row to perform at least one of the memory access operations.

2. The switch of claim 1, wherein the arbitration module schedules memory access operations to service any outstanding lookup requests before scheduling memory access operations to service any outstanding learn requests.

3. The switch of claim 1, wherein the arbitration module schedules the memory access operations to service a lookup request that identifies a destination address, wherein the memory access operations comprise a read operation that indicates the destination address from the lookup request.

4. The switch of claim 3, wherein the arbitration module further determines if the destination address is a multicast address and, if so, to insure that the memory access operations do not include a write operation.

5. The switch of claim 3, wherein the arbitration module further schedules the memory access operations to include a write operation that indicates a particular one of the storage locations within a selected one of the memory banks.

6. The switch of claim 1, wherein a routing entry comprises address information and routing information, wherein the routing information indicates one or more of the ports.

7. The switch of claim 1, wherein the arbitration module schedules the memory access operations to service a learn request that identifies a source address, wherein the memory access operations comprise a read operation that indicates the source address from the lookup request.

8. The switch of claim 1, wherein the memory access operations comprise at least one of a write operation and a read operation.

9. The switch of claim 1, wherein to service a learn request the arbitration module;
schedules first memory access operations that include a read operation indicating a source address from the learn request;
determines whether the read operation detected a miss in the memory banks; and
if the miss is detected, schedules second memory access operations that include a write operation indicating the source address and a port mapping from the learn request.

10. The switch of claim 9, wherein the arbitration module further insures that the first memory access operations do not include any write operations.

11. A method for performing routing table operations comprising:
monitoring for lookup requests and learn requests received from any of a plurality of ports;
detecting a lookup request comprising a destination address;
determining a hash key based on the destination address;
accessing a memory module using the hash key, wherein the memory module comprises a plurality of memory banks logically divided into a plurality of rows, wherein each of the rows comprises a storage location from each of the memory banks, wherein each of the storage locations maintains a routing entry, wherein the hash key indicates one of the row;
determining whether one of the entries from the indicated row includes address information matching the destination address;
if the indicated row includes a matching entry, returning routing information from the matching entry, the routing information identifying one or more of the ports.

12. The method of claim 11, further comprising servicing any outstanding lookup requests prior to servicing any outstanding learn requests.

13. The method of claim 11, further comprising determining that the destination address is a multicast address and, in response, insuring that none of the memory banks perform a write operation while accessing the memory module using the hash key.

14. The method of claim 11, further comprising performing a write operation while accessing the memory module using the hash key, the write operation indicating a particular one of the storage locations within a selected one of the memory banks, wherein accessing the memory module using the hash key reads the entries from the indicated row in all of the memory banks except for the memory bank indicated in the write operation.

15. The method of claim 11, further comprising detecting a learn request that identifies a source address and routing information, determining a second hash key based on the source address, and accessing the memory module using the second hash key, wherein the second hash key indicates a second one of the rows.

16. The method of claim 15, further comprising insuring that none of the memory banks perform a write operation while accessing the memory module using the second hash key.

17. The method of claim 15, further comprising:
determining whether one of the entries from the second indicated row includes address information matching the source address;
if none of the entries match, determining whether the second indicated row includes an empty entry; and
if the second indicated row includes an empty entry, writing the source address and the routing information to the empty entry.

18. A switch comprising:
means for monitoring for lookup requests and learn requests received from any of a plurality of ports;
means for detecting a lookup request comprising a destination address;
means for determining a hash key based on the destination address;
means for accessing a memory module using the hash key, wherein the memory module comprises a plurality of memory banks logically divided into a plurality of rows, wherein each of the rows comprises a storage location from each of the memory banks, wherein each of the storage locations maintains a routing entry, wherein the hash key indicates one of the row;
means for determining whether one of the entries from the indicated row includes address information matching the destination address;
means for, if the indicated row includes a matching entry, returning routing information from the matching entry, the routing information identifying one or more of the ports.

19. The switch of claim 18, further comprising means for determining that the destination address is a multicast address and, in response, insuring that none of the memory banks perform a write operation while accessing the memory module using the hash key.

20. The switch of claim 18, further comprising means for performing a write operation while accessing the memory module using the hash key, the write operation indicating a particular one of the storage locations within a selected one of the memory banks, wherein the means for accessing the memory module using the hash key reads the entries from the indicated row in all of the memory banks except for the memory bank indicated in the write operation.

21. The switch of claim 18, further comprising:
means for detecting a learn request that identifies a source address and routing information;
means for determining a second hash key based on the source address; and
means for accessing the memory module using the second hash key, wherein the second hash key indicates a second one of the rows.

22. The switch of claim 21, further comprising means for insuring that none of the memory banks perform a write operation while accessing the memory module using the second bash key.

23. The switch of claim 21, further comprising:
means for determining whether one of the entries from the second indicated row includes address information matching the source address;
means for, if none of the entries match, determining whether the second indicated row includes an empty entry; and
means for, if the second indicated row includes an empty entry, writing the source address and the routing information to the empty entry.

* * * * *

UNITED STATES PATENT AND TRADEMARK OFFICE
CERTIFICATE OF CORRECTION

PATENT NO. : 7,408,930 B2  Page 1 of 1
APPLICATION NO. : 10/360004
DATED : August 5, 2008
INVENTOR(S) : Sridhar Pathi et al.

It is certified that error appears in the above-identified patent and that said Letters Patent is hereby corrected as shown below:

Col. 10, L. 35: After "module" delete ";" and insert --:--;

Signed and Sealed this

Twenty-ninth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,408,930 B2
APPLICATION NO. : 10/360004
DATED : August 5, 2008
INVENTOR(S) : Sridhar Pathi et al.

It is certified that error appears in the above-identified patent and that said Letters Patent is hereby corrected as shown below:

Col. 12, Lines 34-35, Claim 22, after "second" delete "bash" and insert -- hash --.

Signed and Sealed this

Ninth Day of February, 2010

David J. Kappos
*Director of the United States Patent and Trademark Office*